US009141927B2

(12) United States Patent
Petri et al.

(10) Patent No.: US 9,141,927 B2
(45) Date of Patent: Sep. 22, 2015

(54) DETERMINING COSTS FOR WORKFLOWS

(71) Applicant: International Business Machines Corporation, Armonk, NY (US)

(72) Inventors: John E. Petri, St. Charles, MN (US); William C. Rapp, Rochester, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 13/693,138

(22) Filed: Dec. 4, 2012

(65) Prior Publication Data

US 2013/0096978 A1  Apr. 18, 2013

Related U.S. Application Data

(63) Continuation of application No. 13/033,055, filed on Feb. 23, 2011, now Pat. No. 8,630,959.

(51) Int. Cl.
   *G06Q 10/06*  (2012.01)
   *G06Q 10/10*  (2012.01)
   *G06F 9/44*   (2006.01)

(52) U.S. Cl.
   CPC ............ *G06Q 10/0633* (2013.01); *G06Q 10/06* (2013.01); *G06Q 10/10* (2013.01); *G06Q 10/103* (2013.01); *G06F 8/34* (2013.01)

(58) Field of Classification Search
   CPC ... G06Q 10/06; G06Q 10/0633; G06Q 50/22; G06Q 10/10; G06Q 10/06311
   See application file for complete search history.

(56) References Cited

U.S. PATENT DOCUMENTS

| 7,672,924 | B1 | 3/2010 | Scheurich et al. | |
| 2005/0065826 | A1 | 3/2005 | Baker et al. | |
| 2005/0209841 | A1 | 9/2005 | Arning et al. | |
| 2007/0247656 | A1 | 10/2007 | Manchala et al. | |
| 2008/0183538 | A1* | 7/2008 | Hamadi et al. | 705/8 |
| 2008/0255891 | A1* | 10/2008 | Stone | 705/7 |
| 2008/0304516 | A1 | 12/2008 | Feng et al. | |
| 2009/0089130 | A1 | 4/2009 | Malkin | |
| 2009/0122706 | A1 | 5/2009 | Alfano et al. | |
| 2009/0157448 | A1 | 6/2009 | Malkin | |
| 2009/0171733 | A1* | 7/2009 | Bobak et al. | 705/8 |
| 2012/0116980 | A1 | 5/2012 | Mercuri | |
| 2012/0215582 | A1 | 8/2012 | Petri et al. | |

OTHER PUBLICATIONS

U.S. Appl. No. 13/033,055, entitled "Determining Costs for Workflows", filed Feb. 23, 2011.

* cited by examiner

*Primary Examiner* — Akiba Allen
(74) *Attorney, Agent, or Firm* — Patterson & Sheridan, LLP

(57) ABSTRACT

Techniques are disclosed for modeling costs when editing a workflow process model. A request may be received to assign a cost factor to a workflow process step of the workflow process model. Responsive to the request, the cost factor may be assigned to the workflow process step, such that a traversal of the workflow process step by a transaction invoking the workflow process model results in the cost factor being included in a total cost to be charged for executing the transaction.

20 Claims, 7 Drawing Sheets

DETERMINING COSTS FOR WORKFLOWS

CROSS-REFERENCE TO RELATED APPLICATIONS

This application is a continuation of co-pending U.S. patent application Ser. No. 13/033,055, filed Feb. 23, 2011. The aforementioned related patent application is herein incorporated by reference in its entirety.

BACKGROUND

Advances in computer technology are allowing many organizations to move towards a service-oriented architecture (SOA), where data flows and business logic of an organization are implemented using assemblies of web services. In general, web services are software components capable of being accessed via standard network protocols using a standardized messaging system. Such web services are typically capable of exchanging data with software applications that are written in various programming languages running on various platforms, thus enabling platform independent implementations of data flows and business logic of an organization.

In practice, an individual may utilize workflow modeling and runtime technologies and corresponding standards such as Business Process Execution Language (BPEL) to enable workflow-oriented applications, in which each business process is modeled as a workflow process model, also referred to as a workflow. A workflow is a series of steps involving a mix of services (software and human-provided) that may then be deployed and executed on a number of vendor provided, workflow runtime platforms, such as the IBM® WebSphere® Process Server. For example, a workflow may be a number of loosely coupled web services sending and receiving messages to perform an overall (business) process. A business process expert may link and sequence web services, in a process known as orchestration, to meet a new or existing business requirement. Workflow-oriented applications are central to the SOA pattern and allow a set of generic software services to be used in a variety of different combinations to solve an ever evolving set of business needs.

SUMMARY

Embodiments of the invention provide a computer-implemented method, computer program product and system for performing an operation that includes providing a tool for editing a workflow process model that includes: (i) a plurality of workflow process steps and (ii) branching logic comprising a precondition for traversing at least one workflow process step of the plurality of workflow process steps. The operation also includes receiving a request to assign a cost factor to the at least one workflow process step. The operation also includes assigning the cost factor to the at least one workflow process step responsive to the request, such that a traversal of the at least one workflow process step by a first transaction invoking the workflow process model results in the cost factor being included in a total cost to be charged for executing the first transaction.

Another embodiment of the invention provides a computer-implemented method for performing an operation that includes receiving an indication of (i) what subset of workflow process steps of a workflow process model is traversed in executing a transaction by a processing environment and (ii) when each workflow process step of the subset is traversed, where each workflow process step of the subset has an assigned cost factor. The operation also includes receiving data describing resource utilization of the processing environment at the time that the transaction is executed. The operation also includes determining a total cost to be charged for executing the transaction, based on at least the received indication, the assigned cost factors and the received data.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
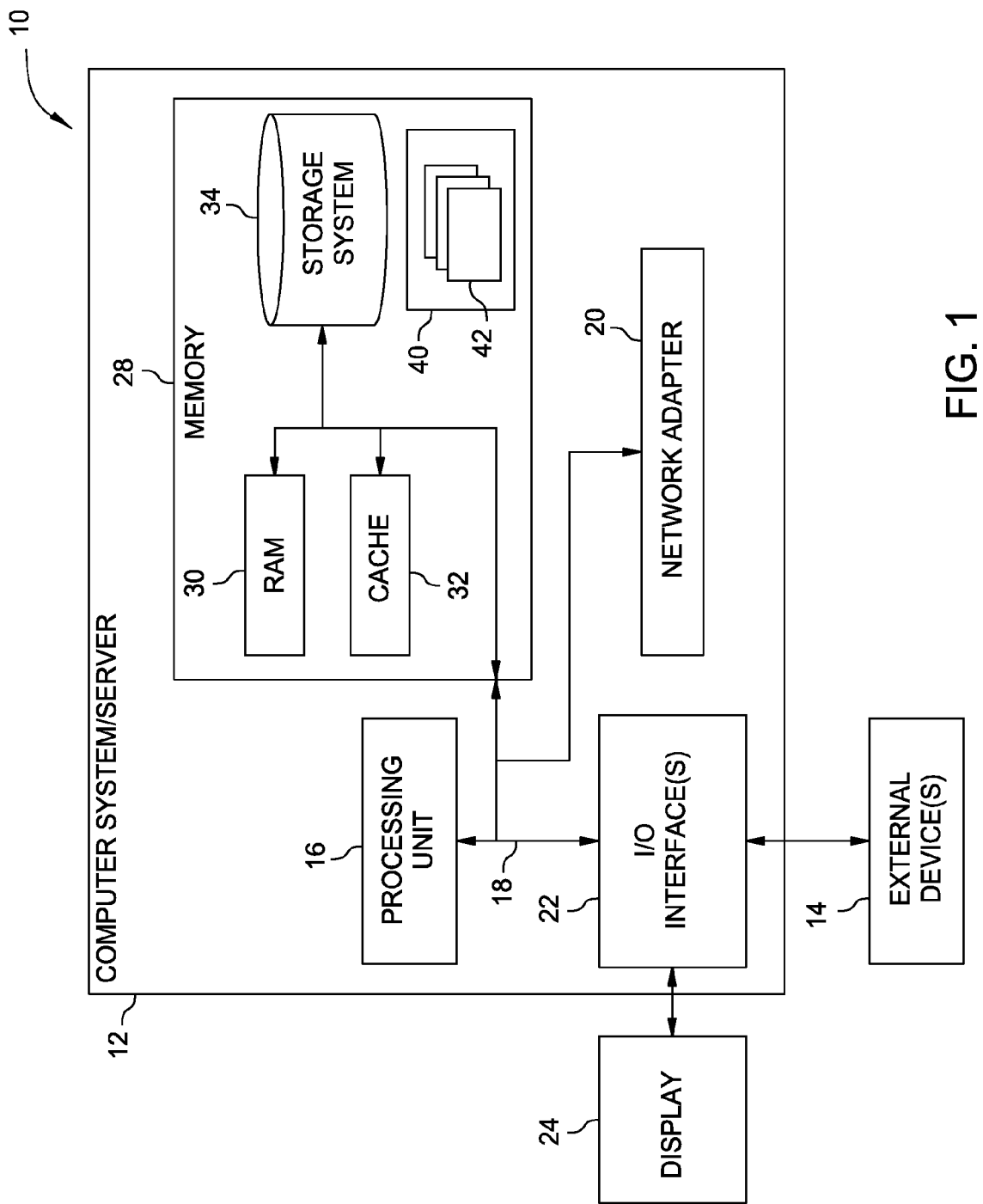
FIG. 1 is a block diagram illustrating a cloud computing node, according to one embodiment of the invention.

Embodiments of the present invention provide techniques for modeling costs to be charged for executing a transaction. As used herein, a transaction refers to any unit of work performed responsive to a request that invokes a workflow process model or causes the workflow process model to be invoked. One embodiment of the invention provides a tool for editing a workflow process model. The workflow process model may be described in a workflow process modeling language such as Business Process Execution Language (BPEL). Of course, other process modeling languages (or approaches generally) may be used. The workflow process model may include multiple workflow process steps. The workflow process model may also include branching logic specifying a precondition for traversing at least one workflow process step, wherein the precondition is expressed as a function of one or more properties of the transaction.

The tool may graphically output the workflow process model for display to a user in one or more graphical user interface (GUI) screens. The user may input commands to the tool to edit the workflow process model using one or more input devices such as a mouse and/or keyboard. For example, one command may allow a user to assign a cost factor to at a workflow process step. The cost factor represents a monetary cost to be charged for traversing the at least one workflow process step. The monetary cost may be expressed in the form of any paper currency, virtual currency, service credit, etc. The cost factor may be a fixed cost or may vary based on properties of the transaction being executed. The cost factor may be stored as part of the workflow process model.

In one embodiment, a service is provided for executing requested transactions, where each transaction invokes a workflow process model. The service determines a cost to be charged for executing each requested transaction. The cost may be determined based on the cost factors stored in the workflow process model. As described above, the cost factors may be assigned to specific workflow process steps of the workflow process model. Accordingly, the service determines a cost to be charged for executing a transaction, based on a permutation of process steps that are actually traversed in executing the transaction—and in accordance with the cost factors assigned by the tool for editing the workflow process model.

Advantageously, determining the cost based on which workflow process steps are traversed may increase revenue of the service provider and/or improve satisfaction of customers requesting execution of transactions, compared to merely determining the cost based on whether a given workflow is invoked or based on resource utilization of the given workflow. Customer satisfaction may be improved because the costs determined using the techniques disclosed herein may more accurately reflect a level of service delivered to the customer. For example, a transaction that does not satisfy a precondition of a workflow process step—and hence does not traverse the workflow process step—does not incur the cost factor associated with the workflow process step. In other words, each transaction only incurs cost factors of workflow process steps actually traversed by the respective transaction. Accordingly, the level of service delivered to the customer may be modeled independently for each workflow process step of a workflow process model.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based-e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
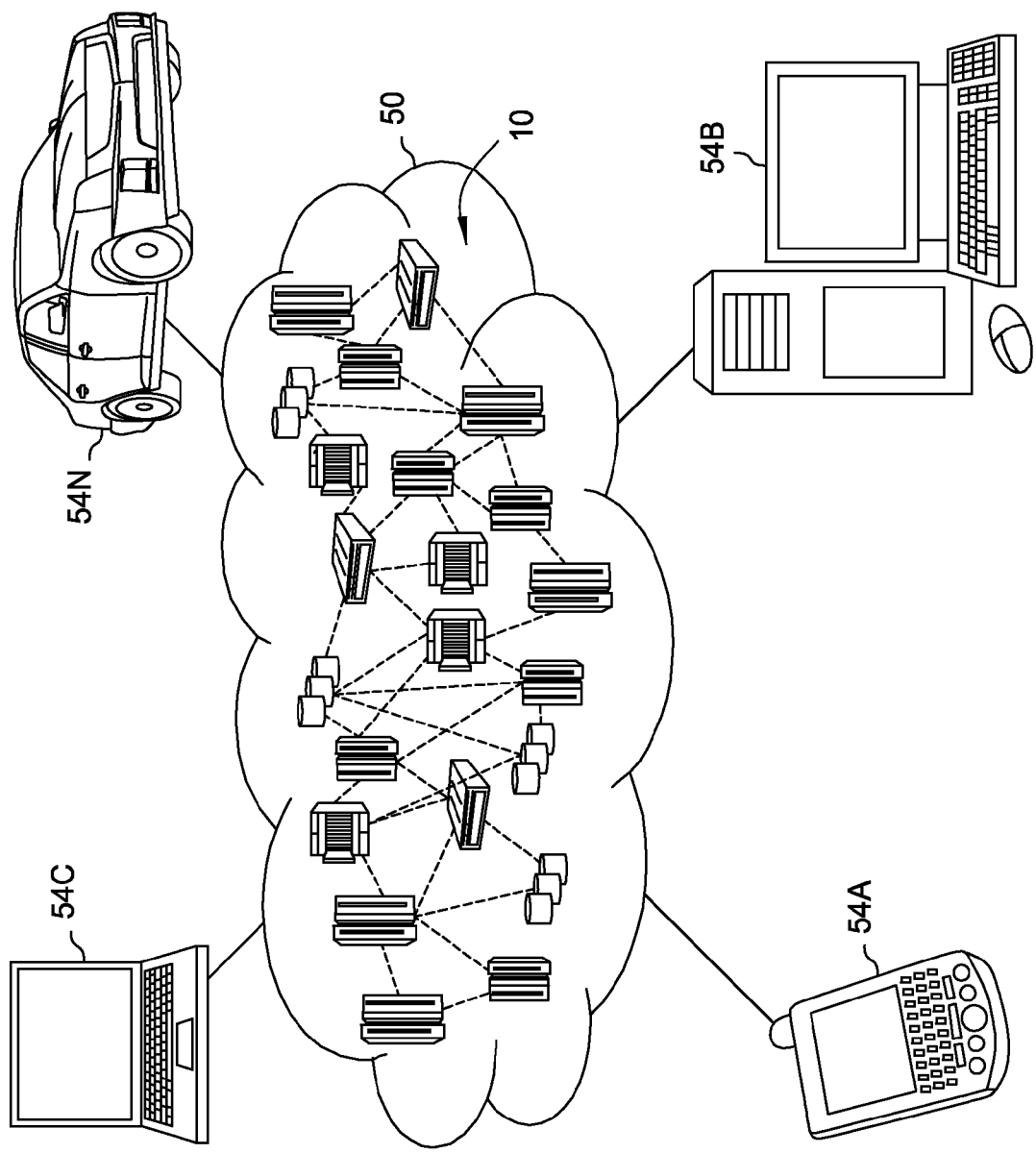
FIG. 2 illustrates a cloud computing environment, according to one embodiment of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
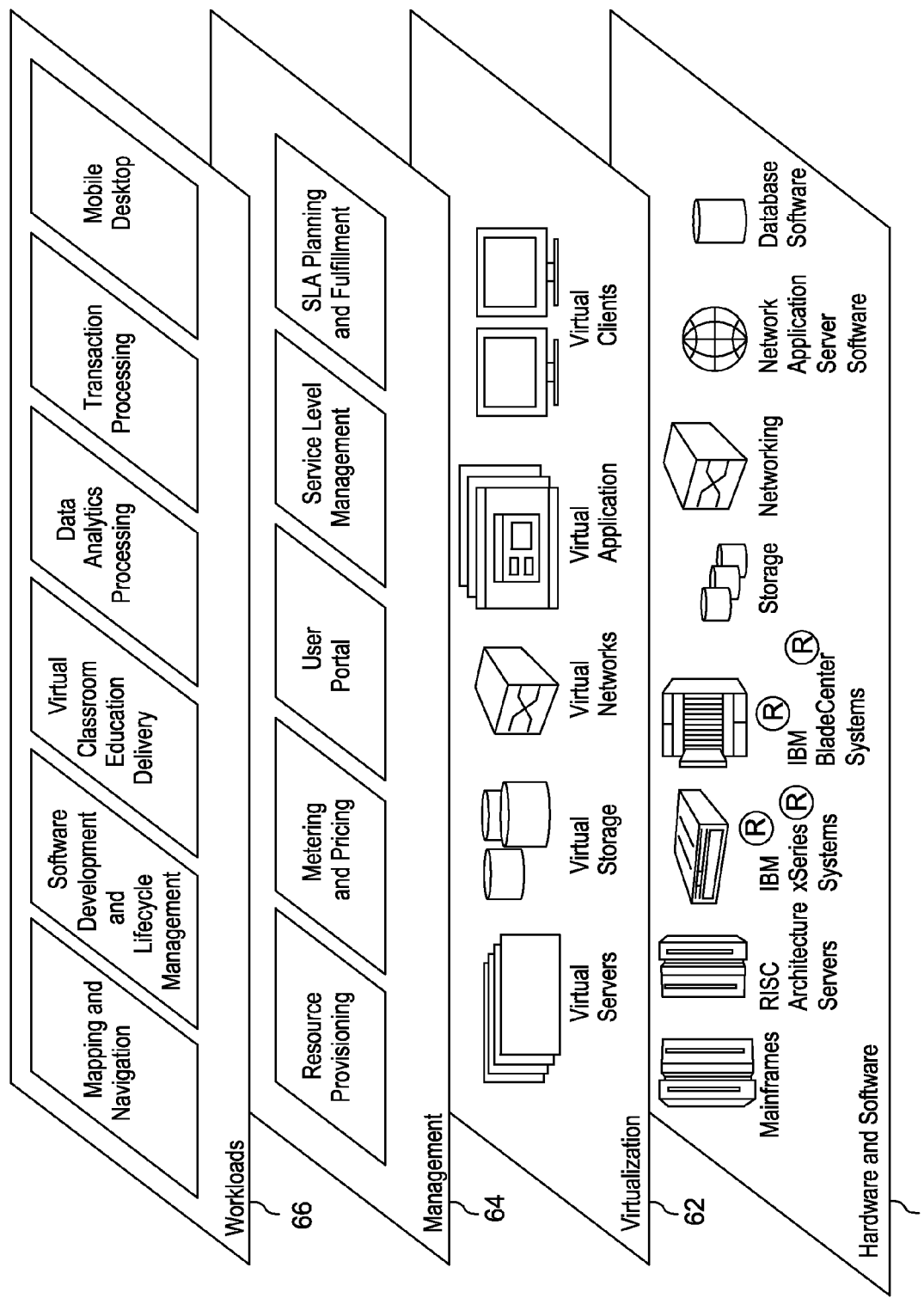
FIG. 3 illustrates abstraction model layers, according to one embodiment of the invention.

Referring now to FIG. 3, a set of functional abstraction layers provided by cloud computing environment 50 (FIG. 2) is shown. It should be understood in advance that the components, layers and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2C®, database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a service for running analytics on medical images) or related data available in the cloud. The accessed applications could execute on a computing system in the cloud and compute a cost to be charged for executing a transaction requested by the user, where the cost is determined based at least in part on which workflow process steps of a workflow process model are traversed in executing the transaction. The accessed applications could then store an indication of the cost at a storage location in the cloud. Thus, the user may access the applications from any computing system attached to a network connected to the cloud (e.g., the Internet) and be charged based on the workflow process step(s) traversed.

Figure 4:
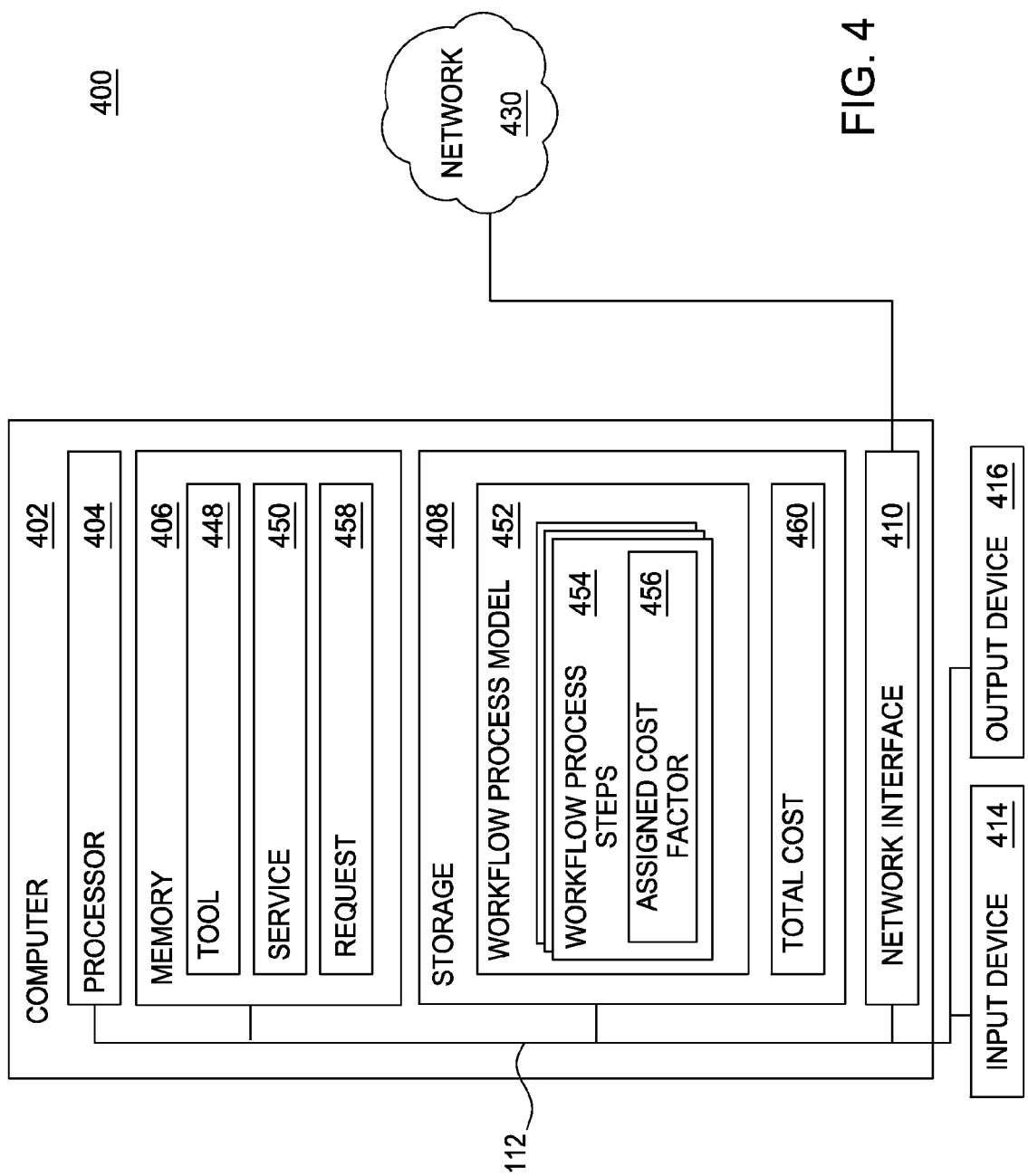
FIG. 4 depicts a block diagram of a networked system for modeling a cost to be charged for executing a transaction, according to one embodiment of the invention.

FIG. 4 depicts a block diagram of a networked system 400 for modeling a cost to be charged for executing a transaction, according to one embodiment of the invention. The networked system 400 includes a computer 402. The computer 402 may also be connected to other computers via the network 430. In general, the network 430 may be a telecommunications network and/or a wide area network (WAN). In a particular embodiment, the network 430 is the Internet.

The computer 402 generally includes a processor 404 connected via a bus 412 to a memory 406, a network interface device 410, a storage 408, an input device 414, and an output device 416. The computer 402 is generally under the control of an operating system. Examples of operating systems include UNIX, versions of the Microsoft Windows® operating system, and distributions of the Linux® operating system. More generally, any operating system supporting the functions disclosed herein may be used. The processor 404 is included to be representative of a single CPU, multiple CPUs, a single CPU having multiple processing cores, and the like. Similarly, the memory 406 may be a random access memory. While the memory 406 is shown as a single identity, it should be understood that the memory 406 may comprise a plurality of modules, and that the memory 406 may exist at multiple levels, from high speed registers and caches to lower speed but larger DRAM chips. The network interface device 410 may be any type of network communications device allowing the computer 402 to communicate with other computers via the network 430.

The storage 408 may be a persistent storage device. Although the storage 408 is shown as a single unit, the storage 408 may be a combination of fixed and/or removable storage devices, such as fixed disc drives, solid state drives (SSD), floppy disc drives, tape drives, removable memory cards or optical storage. The memory 406 and the storage 408 may be part of one virtual address space spanning multiple primary and secondary storage devices.

The input device 414 may be any device for providing input to the computer 402. For example, a keyboard, keypad, light pen, touch-screen, track-ball, or speech recognition unit, audio/video player, and the like may be used. The output device 416 may be any device for providing output to a user of the computer 402. For example, the output device 416 may be any conventional display screen or set of speakers, along with their respective interface cards, i.e., video cards and sound cards (not shown). Although shown separately from the input device 414, the output device 416 and input device 414 may be combined. For example, a display screen with an integrated touch-screen, a display with an integrated keyboard, or a speech recognition unit combined with a text speech converter may be used.

As shown, the memory 406 of the computer 402 includes a tool 448 for creating and/or editing workflow process models, a service 450 for executing requested transactions, and a request 458 for executing a transaction. The storage 408 of the computer 402 includes a workflow process model 452 and a total cost 460 for executing the transaction. The workflow process model 452 includes workflow process steps 454, one or more of which may be assigned a cost factor 456.

In one embodiment, a user providing the workflow process model 452 may desire to execute the workflow process model 452 as a billable service in a cloud environment. Accordingly, the user may provide the service 450, where the service 450 is configured to execute transactions that invoke the workflow process model 452. As used herein, the user providing the workflow process model 452 and/or the service 450 may also be referred to herein as a service provider. Further, the service 450 is also configured to determine the total cost 460 for each transaction that invokes the workflow process model. In accordance with the techniques disclosed herein, the total cost 460 for each transaction may be determined based on which particular workflow process steps are traversed in executing the respective transaction.

To this end, in one embodiment, the user may use the tool 448 to assign cost factors to one or more workflow process steps of the workflow process model 452. Each cost factor may be a fixed cost per traversal of the process step or may vary based on a property of a transaction invoking the workflow process model 452. For example, the user may express a cost factor as a function of a count of images processed in executing a transaction, an amount of storage space used in storing the images, an amount of processing power used in processing the images, a time spent in processing the images, etc. Of course, the type and amount of cost factor for a workflow step may depend on the particular workflow step involved.

In one embodiment, the user providing the workflow process model 452 may assign cost factors to the workflow process model 452 at a finer degree of granularity (e.g., at a workflow process step level rather than at a workflow level). The user may assign a cost factor to a workflow process step to recover expenses incurred in the cloud environment as a result of performing the workflow process step. Additionally or alternatively, the user may assign a cost factor to a workflow process step to capture additional value delivered to a customer requesting execution of the transaction. For example, the user may deem a workflow process step to be more valuable—and, thus, to warrant a higher cost factor—if the workflow process step provides the customer with a higher quality of service or provides premium features such as data analytics.

In one embodiment, after the user modifies the workflow process model 452 to include cost factors, the service 450 uses the workflow process model 452 to compute the total cost 460 for executing the transaction requested by the customer. To this end, the service 450 may record which workflow process steps are traversed in executing the transaction. The service 450 may subsequently map the recorded workflow process steps to the workflow process model 452, adding the cost factor assigned to each traversed step to the total cost 460. In this regard, the service 450 may receive an indication of what subset of workflow process steps of the workflow process model is recorded as being traversed in executing the transaction by the processing environment. The service 450 may also receive an indication of a time during which each workflow process step of the subset is traversed. The service 450 may also receive data describing resource utilization of the processing environment at the time that the transaction is executed (e.g., from log data characterizing historical resource utilization of the processing environment). The service 450 may then determine a total cost to be charged for executing the transaction, based on the received indications, the assigned cost factors and the received data. In an alternative embodiment, the service 450 computes the total cost 460 in real-time—i.e., while the transaction is executing. By including only the cost factors of traversed steps, the service provider may charge the customer an amount that is more reflective of the value delivered to the customer.

Although the features above are described with reference to the service 450, in alternative embodiments, one or more of the features of the service 450 may be performed by other processes. For example, in one embodiment, the recording of the workflow process steps is performed by a monitoring tool of the service provider, and the cost computation is performed by a billing tool of the service provider.

To facilitate understanding of the disclosure, embodiments are herein described with reference to a use case of a medical imaging service executing in a cloud environment. Those skilled in the art will recognize, however, the use case of the medical imaging service is merely exemplary and is not intended to be limiting of the disclosure.

Assume that a customer requests for a transaction to be executed, where the transaction invokes a workflow process model for archiving medical images. Further, assume that the workflow process model includes aneurysm detection for medical images of the human head. In one embodiment, the service provider may assign a first cost factor to a step for archiving the medical images. The service provider may assign a second cost factor to a step for performing aneurysm detection. Accordingly, if the customer is requesting to archive medical images of the human head, both steps are traversed and the service provider may charge the customer an amount that includes both the first cost factor and the second cost factor. Alternatively, if the customer is requesting to archive medical images of the human chest, then the medical images are archived but the aneurysm detection is not performed. In this scenario, the service provider may charge the customer an amount that includes the first cost factor but does not include the second cost factor. Advantageously, by including only the cost factors of workflow process steps actually traversed by a transaction, the service provider may charge the customer an amount that is more reflective of the value delivered to the customer in executing the transaction.

As another example, assume that the service provider desires to model costs for a workflow process model, where the workflow process model includes workflow process steps for storing medical images, for transferring the medical images to specified destinations, and for performing analytics on the medical images, respectively. The workflow process model may also include branching logic that specifies preconditions for one or more of the workflow process steps. While designing the workflow process model, the service provider may assign a cost factor to the workflow process step for storing the medical images, where the cost factor is expressed as a function of the storage space used in storing the medical images. The service provider may also assign a cost factor to the workflow process step for performing analytics on the medical images, where the cost factor is expressed as a function of processor resources used in performing the analytics on the medical images. The service provider may also assign a cost factor to the workflow process step for transferring the medical images, where the cost factor is expressed as a function of an amount of bandwidth used in transferring the medical images. Additionally, suppose that the workflow process model further includes a workflow process step for automatic image routing. The service provider may assign a cost factor to the workflow process step for automatic image routing, where the cost factor is expressed as a function of the number of the medical images that are automatically routed. Accordingly, the service provider may model costs for the workflow process model as a granularity of a workflow process step, during a time that the service provider is designing the workflow process model. As such, the costs may be captured as part of the workflow process model during design time.

Figure 5:
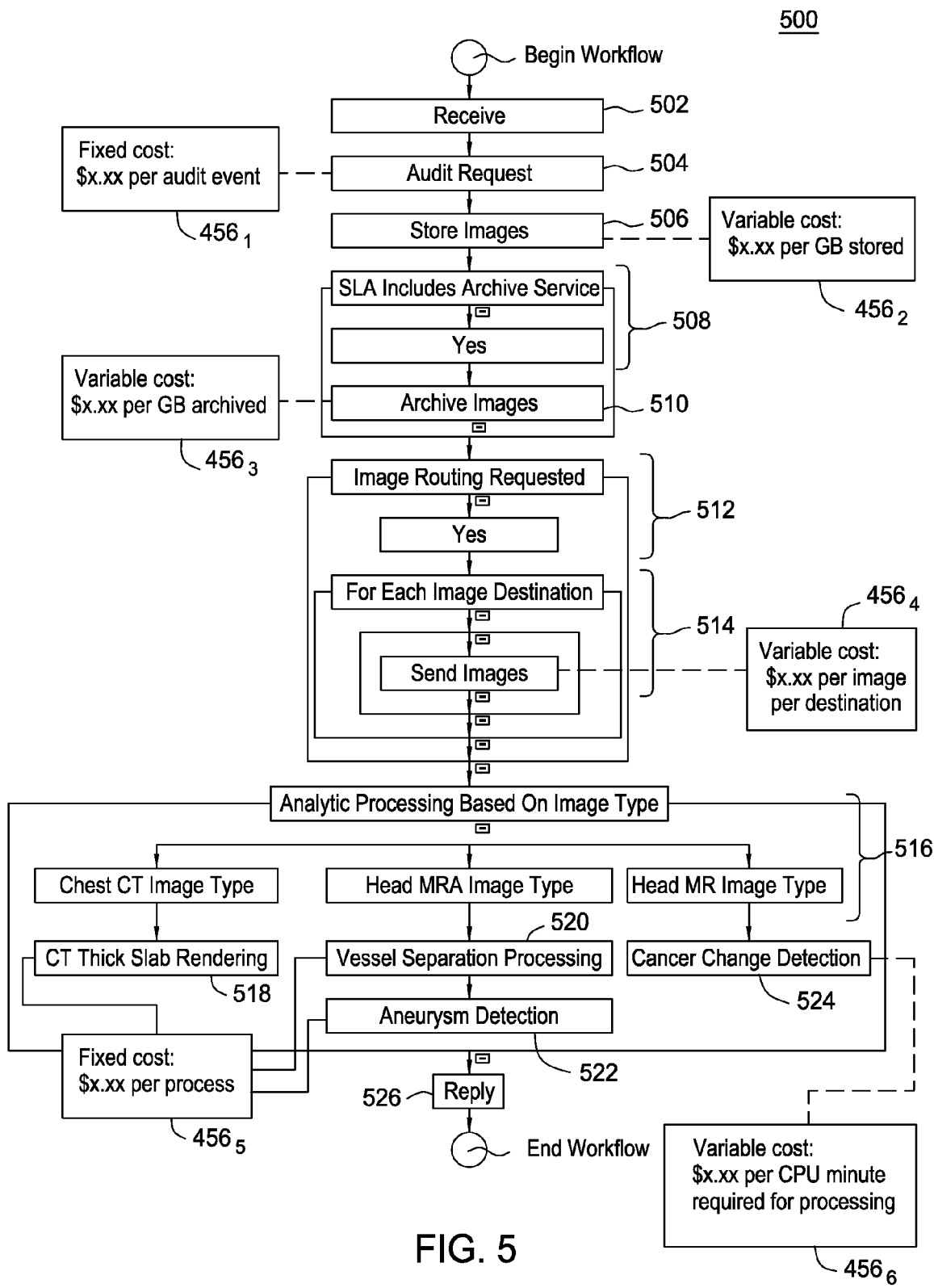
FIG. 5 illustrates an exemplary workflow process model, according to one embodiment of the invention.

FIG. 5 illustrates an exemplary workflow process model 500 for processing medical images, according to one embodiment of the invention. Assume that the workflow process model 500 is invoked by a transaction which execution is requested by a customer. As shown, the workflow process model 500 includes multiple workflow process steps 502-526 and branching logic 508, 512, 516. The workflow process steps include a first step 502 that specifies to receive medical images for processing. The first step 502 is followed by a second step 504 that specifies to audit the request by the customer. The second step 504 is followed by a third step 506 that specifies to store the medical images. The third step 506 is followed by a first branching logic 508 that specifies a precondition for traversing a fourth step 510, the precondition being that a service level agreement (SLA) of the customer includes an archive service. The fourth step 510 specifies to archive the medical images. For example, the medical images may be archived in the cloud environment, to provide long-term preservation of the medical images or to provide integration across an enterprise, e.g., a medical institution having multiple medical facilities.

The first branching logic 508 is followed by a second branching logic 512 that specifies a precondition for traversing a fifth step 514, the precondition being that the request specifies to perform image routing. The fifth step 514 specifies to send the medical images to each image destination specified in the request. The second branching logic 512 is followed by a third branching logic 516 that directs analytic processing to be performed based on image type.

To this end, the third branching logic 516 specifies preconditions 516 for traversing a sixth step 518, seventh and eight steps 520, 522, and a ninth step 524, respectively. A first precondition specifies to traverse the sixth step 518 upon determining that the medical images are computed axial tomography (CT) images of the human chest. The sixth step 518 specifies to perform thick slab rendering of the medical images and is traversed only upon determining that the medical images are CT images of the human chest. Alternatively, a second precondition specifies to traverse the seventh and eighth steps 520, 522 upon determining that the medical images are magnetic resonance angiography (MRA) images of the human head. The seventh step 520 specifies to perform vessel separation processing on the medical images, and the eighth step 522 specifies to perform aneurysm detection based on the medical images. Still alternatively, a third precondition specifies to traverse the ninth step 524 upon determining that the medical images are magnetic resonance (MR) images of the human head. The ninth step 524 specifies to perform cancer change detection based on the medical images. The third branching logic 516 is followed by a tenth step 526 that specifies to generate a reply to the customer regarding the received and/or processed medical images.

In an alternative embodiment, one or more of the workflow process steps may be a task that is performed by a human. For example, the workflow process model may include a step in which a radiologist interprets a set of medical images and generates a report. The techniques disclosed herein may be used to assign costs to the workflow process steps, whether the workflow process steps are performed by a human or executed by a computer.

As described above, in one embodiment, the user may assign cost factors to the workflow process model 452 using the tool 448. Each cost factor may be expressed as a mathematical expression or formula. Depending on the embodiment, the tool 448 may also be used to create and/or edit the mathematical expression or formula. As shown, the exemplary workflow process model 500 includes six cost factors $456_{1-6}$. A first cost factor $456_1$, assigned to the second step 504, specifies a monetary cost as a function of a count of audit events generated. A second cost factor $456_2$, assigned to the third step 506, specifies a monetary cost as a function of an amount of storage space used in storing the medical images. For example, at least in some cases, the amount of storage space used in storing medical images may vary greatly, depending on whether the medical images are generated from an X-ray scan or a full body CT scan. In an alternative embodiment, the second cost factor $456_2$ specifies a monetary cost as a function of a count of medical images stored, rather than the amount of storage space used.

As shown, a third cost factor $456_3$, assigned to the fourth step 510, specifies a monetary cost as a function of an amount of storage space used in archiving the medical images. A fourth cost factor $456_4$, assigned to the fifth step 514, specifies a monetary cost as a function of a count of the medical images and a count of image destinations specified in the request. A fifth cost factor $456_5$, assigned to the sixth step 518, the seventh step 520, and the eighth step 522, respectively, specifies a monetary cost as a function of a count of analytic processes executed for the transaction. A sixth cost factor $456_6$, assigned to the ninth step 524, specifies a monetary cost as a function compute resources used in performing cancer change detection, where the compute resources are expressed in processor-minutes.

Advantageously, by assigning the cost factors $456_{1-6}$ to the exemplary workflow process model 500 using the tool 448, the user may independently model customer value for each workflow process step of the exemplary workflow process model 500. The assigned cost factors $456_{1-6}$ are used by the service 450 in determining the total cost 460 that the customer is charged for executing the transaction, whereby the total cost 460 is more reflective of the value derived by the user in executing the transaction, compared to determining a total cost in the absence of the cost factors $456_{1-6}$, e.g., by merely considering whether a given workflow is invoked or the compute resources used by the given workflow. Accordingly, customer satisfaction may be improved and/or revenue for the service provider may be increased in at least some cases.

Figure 6:
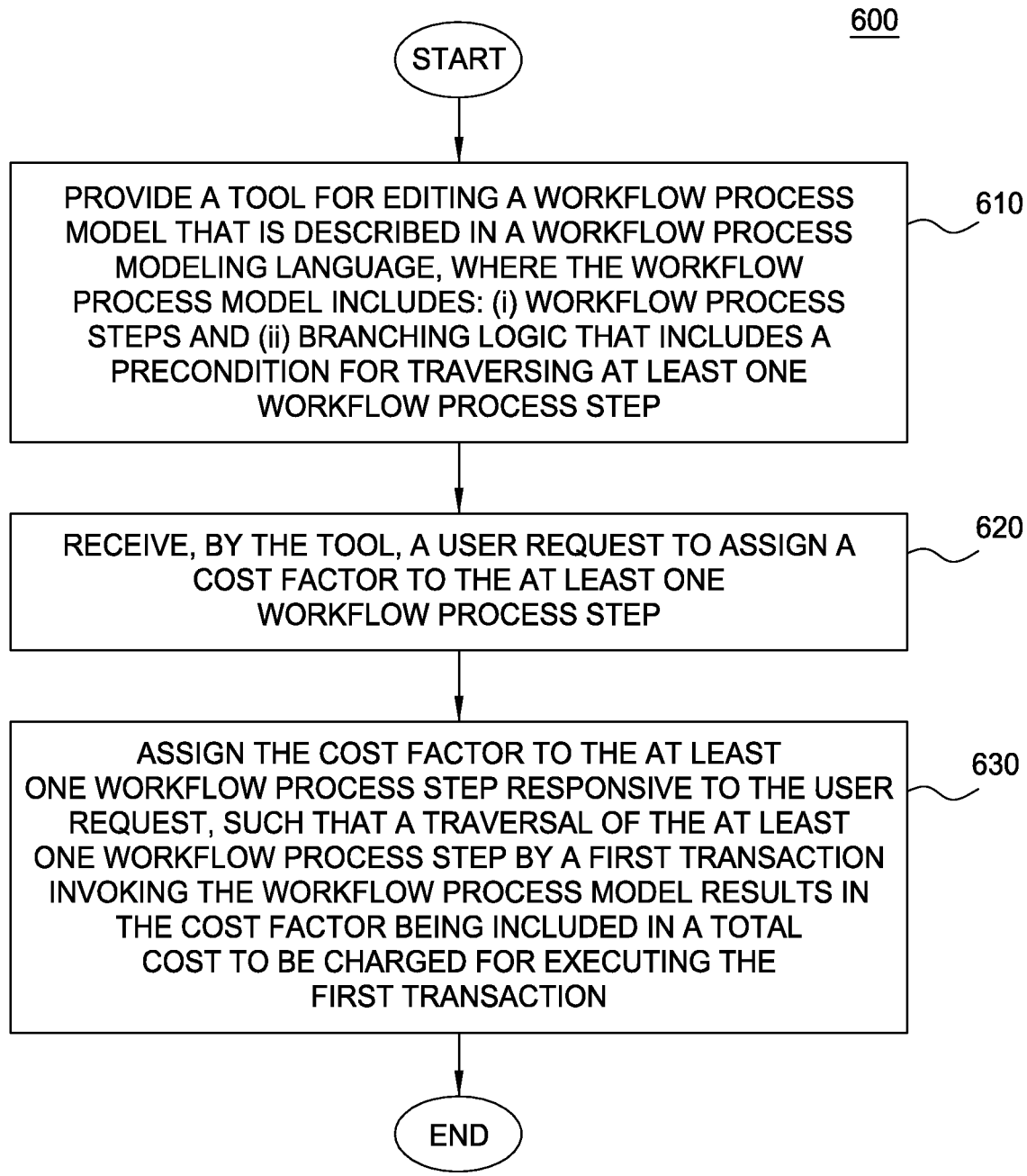
FIG. 6 is a flowchart depicting a method for creating a workflow process model that includes cost factors, according to one embodiment of the invention.

FIG. 6 is a flowchart depicting a method 600 for creating a workflow process model that includes cost factors, according to one embodiment of the invention. As shown, the method 600 begins at step 610, where the user is provided a tool for editing the workflow process model. The workflow process model is described in a workflow process modeling language and includes workflow process steps and branching logic. The branching logic includes a precondition for traversing at least one of the workflow process steps.

At step 620, the tool receives a user request to assign a cost factor to the at least one workflow process step. At step 630, the tool assigns the cost factor to the at least one workflow process step, responsive to the user request, such that a traversal of the at least one workflow process step by a first transaction invoking the workflow process model results in the cost factor being included in a total cost to be charged for executing the first transaction. After the step 630, the method 600 terminates.

Figure 7:
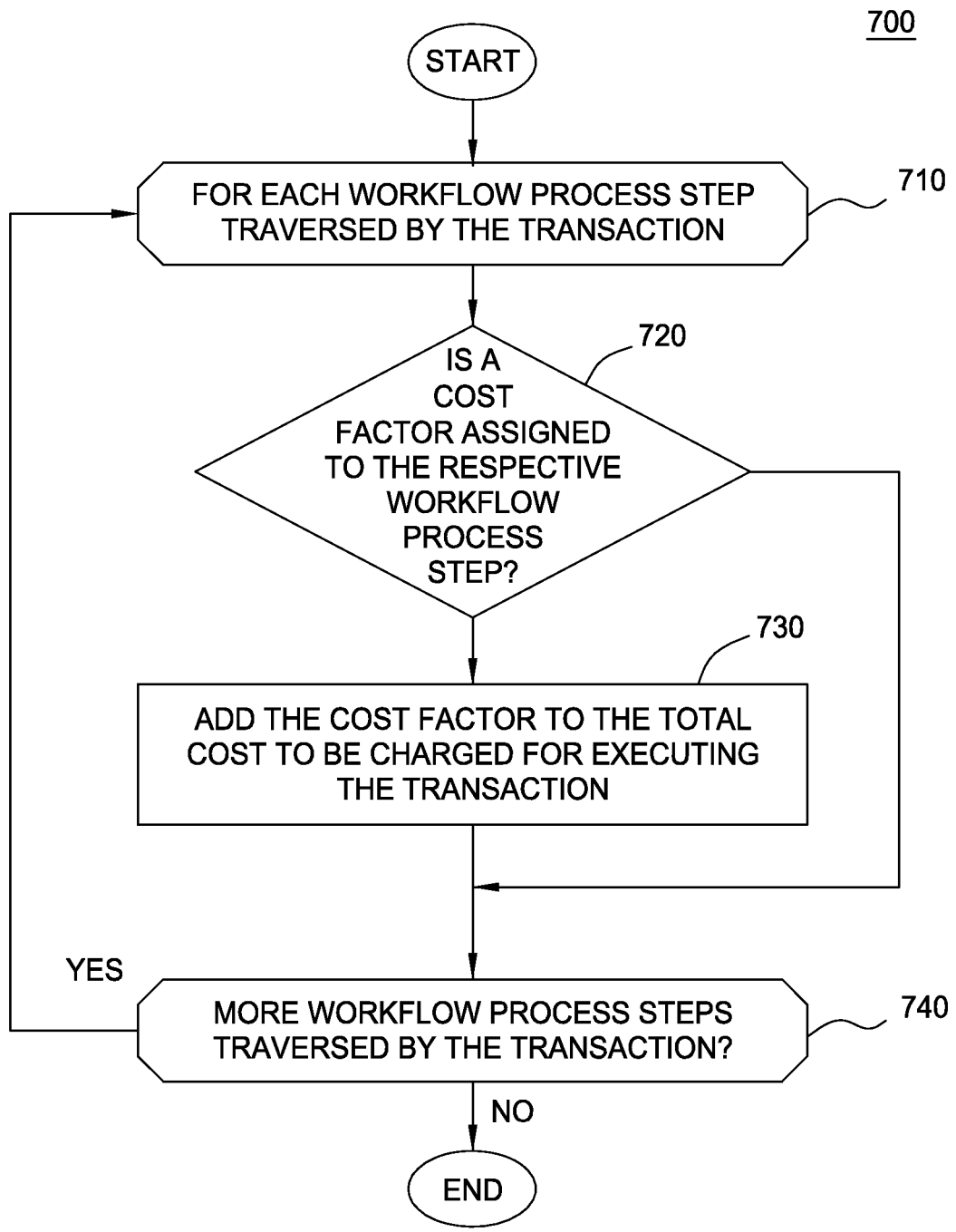
FIG. 7 is a flowchart depicting a method for determining a total cost to be charged for executing a transaction, according to one embodiment of the invention.

FIG. 7 is a flowchart depicting a method 700 for determining a total cost to be charged by the service 450 for executing a transaction, according to one embodiment of the invention. As shown, the method 700 begins at step 710, where the service 450 enters a loop to evaluate each workflow process step traversed by the transaction. At step 720, the service 450 determines whether a cost factor is assigned to the respective workflow process step. If so, the method 700 proceeds to step 730, where the service 450 adds the cost factor to the total cost to be charged for executing the transaction. After the step 730 or if no cost factor is assigned to the respective workflow process step (step 720), the method 700 proceeds to step 740, where the service 450 determines whether more workflow process steps remain to be evaluated. If so, the method 700 returns to the step 710, where the service 450 evaluates the remaining workflow process steps. Otherwise, the method 700 terminates.

Advantageously, embodiments of the invention provide techniques for modeling costs specific to workflow process steps of a workflow process model, at a time of designing the workflow process model. One embodiment of the invention provides the tool for editing the workflow process model. A user creating and/or editing the workflow process model may use the tool to assign cost factors to the workflow process steps. Subsequently, any transaction that invokes the workflow process model and that traverses a given workflow process step incurs the cost factor assigned to the given workflow process step. On the other hand, a transaction does not incur the cost factor assigned to the workflow process step if the transaction does not traverse the workflow process step. Accordingly, a total cost to be charged for executing the transaction may be computed based on the cost factors assigned to the workflow process steps traversed by the transaction. Advantageously, by assigning costs to each workflow process step of a workflow process model, the user may more conveniently and accurately model value delivered to a customer requesting execution of the transaction, thereby improving customer satisfaction and/or increasing revenue of the service provider at least in some cases.

While the foregoing is directed to embodiments of the present invention, other and further embodiments of the invention may be devised without departing from the basic scope thereof, and the scope thereof is determined by the claims that follow.

What is claimed is:

1. A computer-implemented method to provide workflow process models having step-specific cost attributes based on transaction and environment properties, the computer-implemented method comprising:
    providing a tool having a graphical user interface (GUI) and that facilitates editing a workflow process model comprising: (i) a plurality of workflow process steps and (ii) branching logic comprising a precondition for traversing at least a first workflow process step of the plurality of workflow process steps;
    receiving, by the tool, a request to assign a step-specific cost attribute to the first workflow process step, wherein the step-specific cost attribute is a predefined function of a plurality of distinct properties including a transaction property and an environment property; and
    assigning the cost factor to the first workflow process step responsive to the request and by operation of one or more computer processors, such that traversal of the first workflow process step by a first transaction invoking the workflow process model results in the step-specific cost attribute being included in a total cost to charge for executing the first transactions;
    wherein the workflow process model is aborted mid-execution by a workflow runtime platform in order to comply with a cost threshold specified in a service level agreement, wherein the cost threshold comprises at least one of a step-specific cost threshold and a model-specific cost threshold.

2. The computer-implemented method of claim 1, wherein the total cost to charge for executing the first transaction is a function of which specific one or more workflow process steps of the workflow process model are traversed in executing the first transaction.

3. The computer-implemented method of claim 1, wherein a second transaction invoking the workflow process model and not traversing the at least one workflow process step does not incur the step-specific cost attribute in a total cost to charge for executing the second transaction.

4. The computer-implemented method of claim 1, wherein the step-specific cost attribute is stored as part of the workflow process model.

5. The computer-implemented method of claim 1, wherein the workflow process model is described in a workflow process modeling language.

6. The computer-implemented method of claim 5, wherein the workflow process modeling language comprises Business Process Execution Language (BPEL).

7. A computer-implemented method of cost determination for workflow process models having step-specific cost attributes based on transaction and environment properties, the computer-implemented method comprising:
    receiving an indication of: (i) a subset of workflow process steps of a workflow process model traversed in executing a transaction by a processing environment and (ii) when each workflow process step of the subset is traversed; wherein the workflow process model is aborted mid-execution by a workflow runtime platform in order to comply with a cost threshold specified in a service level agreement, wherein the cost threshold comprises at least one of a step-specific cost threshold and a model-specific cost threshold, wherein at least a first workflow process step of the subset has an assigned step-specific cost attribute, wherein the step-specific cost attribute is a predefined function of a plurality of distinct properties including a transaction property and an environment property, wherein the step-specific cost threshold is assigned via a tool that facilitates editing the workflow process model, the tool having a graphical user interface (GUI);
    receiving data describing resource utilization of the processing environment at the time that the transaction is executed; and
    by operation of one or more computer processors, determining a total cost be charge for executing the transaction, based on at least the received indication, the assigned step-specific cost attribute, and the received data.

8. The computer-implemented method of claim 1, wherein the workflow process model is abortable mid-execution in order to comply with, in respective instances, each of: (i) the step-specific cost threshold and (ii) the model-specific cost threshold;
    wherein a second transaction invoking the workflow process model and not traversing the first workflow process step does not incur the step-specific cost attribute in a total cost to charge for executing the second transaction, wherein the step-specific cost attribute is stored as part of the workflow process model, wherein the workflow process model is described in a workflow process modeling language.

9. The computer-implemented method of claim 8, wherein in a first instance, the workflow process model is aborted mid-execution in order to comply with the step-specific cost threshold, wherein in a second instance, the workflow process model is aborted mid-execution in order to comply with the model-specific cost threshold;

wherein the step-specific cost attribute is a predefined function of a degree of overall utilization of a first resource type in the processing environment at a time that the first transaction traverses the first workflow process step, wherein the step-specific cost attribute is assigned to the first workflow process step such that traversal of the first workflow process step by the first transaction results in the step-specific cost attribute being calculated based on the predefined function and being included in the total cost to charge for executing the first transaction.

10. The computer-implemented method of claim 9, wherein the transaction property comprises a resource amount, of the first resource type, that is used by the first transaction invoking the workflow process model, in traversing the first workflow process step;

wherein the environment property comprises the degree of overall utilization of the first resource type in the processing environment at the time that the first transaction traverses the first workflow process step.

11. The computer-implemented method of claim 10, wherein the request is received from a requesting entity, wherein the total cost comprises a total cost to charge the requesting entity for executing the first transaction, wherein the step-specific cost attribute of the first workflow process step is positively correlated with both: (i) the resource amount of the first resource type and (ii) the degree of overall utilization, of the first resource type, in the processing environment.

12. The computer-implemented method of claim 11, wherein the provided tool is configured to independently assign a respective step-specific cost attribute that pertains to each individual resource type selected from:
   (i) processor utilization in the processing environment;
   (ii) memory utilization in the processing environment;
   (iii) storage utilization in the processing environment; and
   (iv) network utilization in the processing environment.

13. The computer-implemented method of claim 12, wherein the plurality of workflow process steps of the workflow process model includes:
   the first workflow process step, of which the transaction and environment properties of the step-specific cost attribute pertain to processor utilization and do not pertain to any of memory utilization, storage utilization, and network utilization; and
   a second workflow process step having a step-specific cost attribute including transaction and environment properties pertaining to memory utilization and not pertaining to any of processor utilization, storage utilization, and network utilization.

14. The computer-implemented method of claim 13, wherein the plurality of workflow process steps of the workflow process model further includes:
   a third workflow process step having a step-specific cost attribute including transaction and environment properties pertaining to storage utilization and not pertaining to any of processor utilization, memory utilization, and network utilization; and
   a fourth workflow process step having a step-specific cost attribute including transaction and environment properties pertaining to network utilization and not pertaining to any of processor utilization, memory utilization, and storage utilization.

15. The computer-implemented method of claim 14, wherein the step-specific cost attribute of each of the first, second, third, and fourth workflow process steps is positively correlated with both: (i) the resource amount of the resource type of the respective workflow process step and (ii) the degree of overall utilization, of the resource type of the respective workflow process step, in the processing environment.

16. The computer-implemented method of claim 15, wherein the resource amount of the resource type of each of the first, second, third, and fourth workflow process steps is a different resource amount, wherein the workflow process model further includes step-specific branching logic specifying a precondition for traversing the first workflow process step.

17. The computer-implemented method of claim 16, wherein the total cost to charge for executing the first transaction is a function of:
   (i) which specific one or more workflow process steps of the workflow process model are traversed in executing the first transaction;
   (ii) the resource amounts used in the traversed workflow process steps; and
   (iii) an overall degree of utilization of the resource type corresponding to the resource amount used, in the processing environment at the time of traversing the workflow process steps.

18. The computer-implemented method of claim 17, wherein the workflow process model is adapted for execution by an application separate from the tool, wherein the application configured to abort execution of the first workflow process step to comply with the step-specific cost threshold, wherein the application is further configured to abort execution of the workflow process model to comply with the model-specific cost threshold, wherein the model-specific cost threshold is higher than the step-specific cost threshold, wherein the workflow process modeling language comprises Business Process Execution Language (BPEL).

19. The computer-implemented method of claim 18, wherein the plurality of workflow process steps of the workflow process model further includes a fifth workflow process step having a step-specific cost attribute:
   (i) that is a predefined function of a transaction property comprising a resource amount, of a fifth resource type, that is used by the first transaction in traversing the fifth workflow process step; and
   (ii) that is not a function of an environment property comprising a degree of overall utilization of the fifth resource type in the processing environment at a time that the first transaction traverses the fifth workflow process step.

20. The computer-implemented method of claim 19, wherein the plurality of workflow process steps of the workflow process model further includes a sixth workflow process step having a step-specific cost attribute:
   (i) that is a predefined function of an environment property comprising a degree of overall utilization of a sixth resource type in the processing environment at a time that the first transaction traverses the sixth workflow process step; and
   (ii) that is not a function of a transaction property comprising a resource amount, of the sixth resource type, that is used by the first transaction in traversing the sixth workflow process step.

* * * * *